United States Patent [19]

Decroix

[11] 4,047,679
[45] Sept. 13, 1977

[54] TRIANGULAR-WING GLIDER

[75] Inventor: Paul Marcel Edmond Decroix, Puteaux, France

[73] Assignee: Societe d'Equipements Divers Pour la Population Civile et l'Aviation Sedpa, France

[21] Appl. No.: 647,160

[22] Filed: Jan. 7, 1976

[30] Foreign Application Priority Data

Jan. 7, 1975 France .................. 75.00290

[51] Int. Cl.² .......................... B64C 31/02
[52] U.S. Cl. ...................... 244/16; 244/DIG. 1
[58] Field of Search ............... 244/16, DIG. 1, 45 A, 244/138 R, 153 R

[56] References Cited

U.S. PATENT DOCUMENTS 3,295,793  1/1967  Renart ............... 244/153 R X

FOREIGN PATENT DOCUMENTS 1,244,586  7/1967  Germany ............... 244/DIG. 1

Primary Examiner—Trygve M. Blix
Assistant Examiner—Barry L. Kelmachter
Attorney, Agent, or Firm—Diller, Brown, Ramik & Wight

[57] ABSTRACT

A light triangular-wing glider, comprises an auxiliary wing or stabilizer, arranged in an average plane approximately parallel to that of the principal wing, in front and above the latter. This auxiliary wing is flexible, principally constituted from a material such as cloth and capable of taking a curvilinear shape under the influence of the relative airstream. The pilot can thereby modify the angle of attack of the whole of the glider and notably pull the craft out of a dive.

3 Claims, 5 Drawing Figures

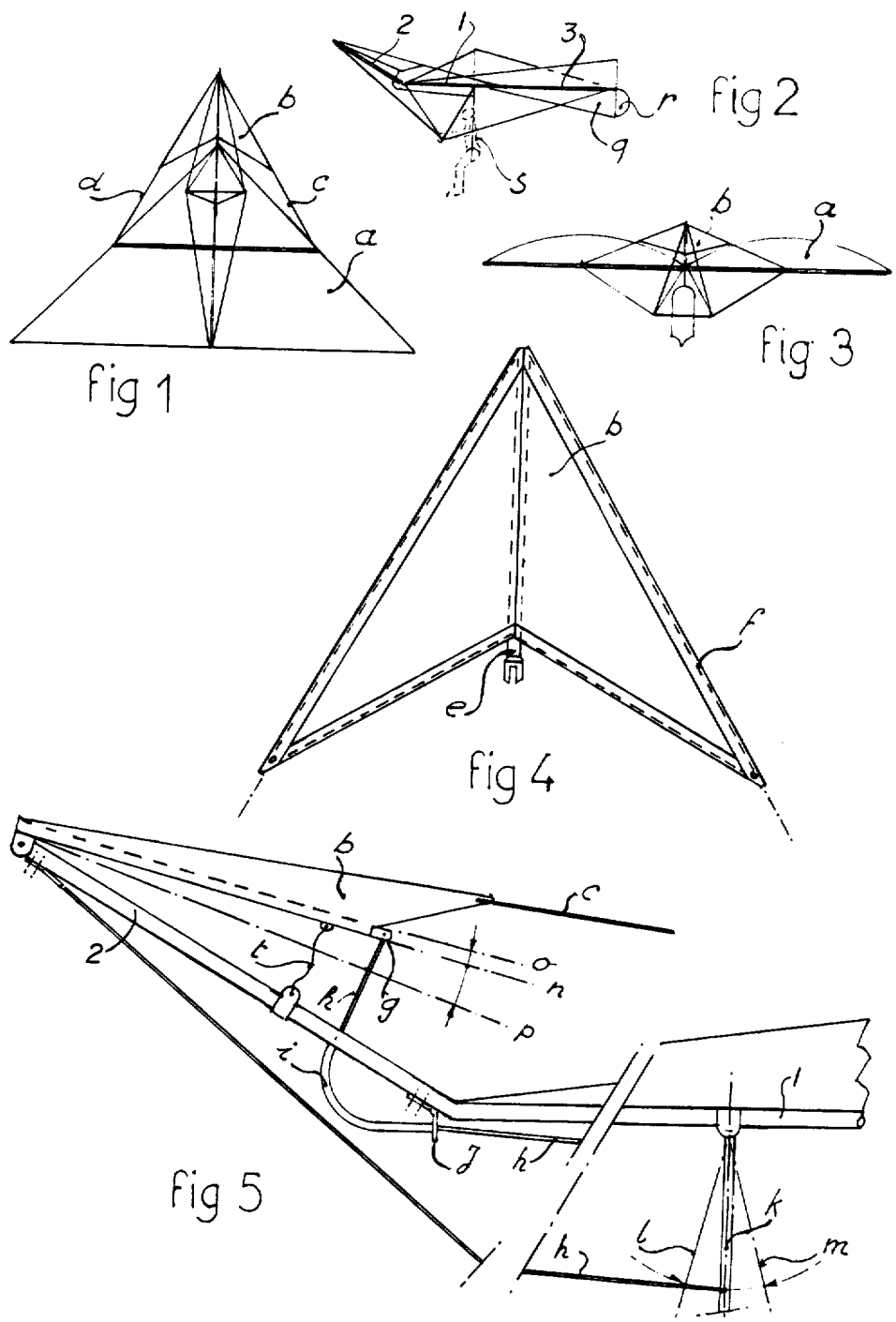

TRIANGULAR-WING GLIDER

BACKGROUND OF THE INVENTION

1. Field of the Invention

The present invention relates to a triangular-wing glider.

Gliding on an ultra-light glider is a sport practised by an increasing number of devotees. The glider most used is a craft with a triangular shape in plan, also called: delta wing.

2. Description of the Prior Art

Such a a craft does not possess any control surface. It is piloted by swinging movement of the pilot's body. It cannot execute steep turns. If for any reason it is put into a steep dive, it remains in this trajectory without the possibility of pulling out. This latent defect of the design is the cause of numerous fatal or very serious accidents. To avoid the danger, it is flown at an angle of attack closer to the angle of maximum lift than that of the maximum lift/drag ratio, which confers on the aircraft a mediocre lift/drag ratio.

OBJECTS AND SUMMARY OF THE INVENTION

It is an object of the present invention to provide an assembly of means whose addition to a triangular wing glider enables the above-mentioned faults to be eliminated.

According to the invention the principal mean obtaining this result is an auxiliary wing or stabilizer, arranged in an average plane substantially parallel with that of the principal wing, forward and above the latter, this wing being flexible, principally constituted from a material such as fabric, and capable of taking a curvilinear shape under the influence of the relative airstream.

Preferably, the position of the average plane of the stabilizer with respect to that of the principal wing, can be varied as desired by the pilot, who can thus modify the angle of attack of the whole glider and notably pull out the aircraft in the case of a dive.

In an advantageous embodiment, the stabilizer comprises a piece of fabric, which may be in the form of a forward pointing triangle, a central rod fast to the middle of the fabric and located in the vertical axial plane of the craft, and guys to tension the sides of the fabric.

To vary the angle of attack of the glider, the central rod is preferably hinged at its front on an extension of the frame of the principal wing, whilst the rear end of said rod is fast to a control for the angle of attack, placed at the disposal of the pilot, the assembly being arranged to permit the pilot to move said central rod in the vertical axial plane of the glider.

Preferably also, the auxiliary wing does not include another rod. In this way, the maximum flexibility during flight is obtained and the greatest facility of folding for transportation on the ground.

In an advantageous embodiment, the angle of attack control is constituted by a bar located in front of the pilot and connected to the auxiliary wing so that the control is coupled with the swinging movement of the pilot borne by his harness so that the auto-stabilizing effect of the displacement of the center of gravity of the craft is amplified.

The axis connecting the centers of pressure of the principal wing of the stabilizer constitute the roll axis. It has, relative to the horizontal, a positive angle of attack, which permits the curvature of the wing to be much reduced, which curvature being generated by a cone, does not have good aerodynamic efficiency. Its yaw-stabilizing action is then replaced by a fin terminated by a rudder actuated by cables or a linkage, actuated by transverse coupling with the stabilizer control or levers (bicycle brake controls) fixed on the control bar.

BRIEF DESCRIPTION OF THE DRAWINGS

In order that the invention may be more fully understood, one embodiment of the delta wing glider according to the invention will be described below, purely by way of nonlimiting example, with reference to the accompanying drawings, in which:

FIG. 1 is a view from above of an embodiment of a delta wing glider according to the invention;

FIG. 2 is a side view of the embodiment of FIG. 1;

FIG. 3 is a front view of the embodiment of the FIGS. 1 and 2;

FIG. 4 is a view from above, on an enlarged scale, of the stabilizer of the embodiment of FIGS. 1 to 3; and FIG. 5 is a side view, on the same enlarged scale, of the stabilizer of FIG. 4 and of its control.

DESCRIPTION OF A PREFERRED EMBODIMENT

In the Figures the delta wing glider has a triangular wing $a$, provided with a stabilizer $b$, placed on front and above the triangular wing. This stabilizer is a flexible wing. Its geometry is determined by the guys $c$ and $d$ (FIGS. 1 and 5) tensioning the reinforcement $f$ (FIG. 4) and the rod $e$ (FIG. 4), terminated by the clevis $g$ (FIG. 5), the starting point of the cable $h$.

The cable $h$ is guided by a tube (or a flexible sheath) $i$ up to a fixed point $j$; it terminates in an anchorage (according to the rules in the art) on the control $k$. This control has a movement $l$, $m$.

In normal flight position, the angle of attack is along $n$.

In a dive, on movement towards $l$ of the control $k$, the angle of attack will be along $o$. This angle of attack is limited to the minimum allowable by the cable $t$.

In nose-up attitude on movement of $k$ towards $m$, the angle of attack will be along $p$. The angles of attack $n-o$ and $n-p$, are deliberate. The control $k$ is actuated by the movement of the pilot $s$ (FIG. 2). The required angle $o$ corresponds to the angle of maximum lift/drag ratio. The required angle $p$ corresponds to the angle of maximum lift, of landing from an abrupt descent or for pulling out of a dangerous dive, due for example, to strong turbulence.

The stabilizer $b$, possessing neither spar nor ribs, is flexible and light. This flexibility and this lightness, combined with elasticity (which can be increased by the addition of springs or rings of rubber or the like), of the guy-braces $c$ and $d$, enable the angle of attack to be reduced or increased automatically, according to the direction and strength of the atmospheric eddies encountered in flight.

In all types of flight, the pressure (and the suction) of the air, being countered by the tensioned guys $c$ and $d$ and the rod $e$, gives the stabilizer a double curvilinear (called gull's wing) cross section (perpendicular to the axis of translation) which is the cross section of optimum efficiency of this type of wing.

The pilot's suspension harness is fixed to the lever $k$, which integrates the movements of the pilot's body with the variations in the angle of attack of the stabilizer. The piloting is not altered, the pilot does not therefore have to acquire new reflexes.

Besides and to facilitate training, the stabilizer may be locked at a desired fixed angle of attack. In this case, the cable h is eliminated, an adjustale ling-rod replacing the cable t.

In FIG. 2 a stabilizing fin g is shown, in the form of a vertical triangle fixed in the axial plane of the craft above and/or below the plane of the principal wing and terminated by a steering rudder r.

One of the features of the invention is that the stabilizer, in the same way as the stabilizing fin and the rudder, may be adapted to a preexisting "Delta" glider without great modification, the principal axial spar 1 of the glider illustrated in FIGS. 2 and 5 being either one provided with a forwardly directed extension 2 or one which has been changed to have a greater forward length, which represents an expense of little cost, and the other modifications consist essentially of the fixing of the necessary guys and of the control device. This is the same for the mounting of the vertical stabilizer and the rudder.

I claim:

1. Light triangular wing glider having a center of gravity and a vertical longitudinal middle plane, said glider comprising a principal wing having a frame and being in the form of a forward pointing triangle, a pilot's suspension harness under said principal wing, an auxiliary flexible wing positioned in front of said principal wing; said auxiliary flexible wing consisting essentially of a piece of cloth-like material essentially symmetrical with respect to said vertical longitudinal middle plane, a central rigid rod fastened to said piece of cloth-like material along its line of symmetry, and guys secured to side edges of said piece of cloth-like material for tensioning the cloth-like material, said glider including further means for maintaining said auxiliary wing in an average plane approximately parallel to the plane of said principal wing; and means for varying the position of the average plane of said auxiliary wing with respect to the plane of attack of the principal wing whereby the angle of attack of the whole glider can be modified and the glider can be pulled out of a dive.

2. A glider according to claim 1 wherein said means for varying the position of the average plane of said auxiliary wing includes means hingedly mounting said central rod at the front of said central rod on an extension of the frame of said principal wing for movement in said vertical longitudinal middle plane, and means connecting a rear end of said rod to an angle of attack control device placed at the disposal of the pilot, whereby a pilot can move said rod in said vertical longitudinal middle plane.

3. Light triangular wing glider having a center of gravity and a vertical longitudinal middle plane, said glider comprising a principal wing having a frame and being in the form of a forward pointing triangle, a pilot's suspension harness under said principal wing, an auxiliary flexible wing positioned in front of said principal wing; said auxiliary flexible wing consisting essentially of a piece of cloth-like material essentially symmetrical with repsect to said vertical longitudinal middle plane, a central rigid rod fastened to said piece of cloth-like material along its line of symmetry, said glider including further means for maintaining said auxiliary wing in an average plane approximately parallel to the plane of said principal wing; and means for varying the position of the average plane of said auxiliary wing with respect to the plane of attack of the principal wing whereby the angle of attack of the whole glider can be modified and the glider can be pulled out of a dive, said means for varying the position of the average plane of said auxiliary wing includes means hingedly mounting said central rod at the front of said central rod on an extension of the frame of said principal wing for movement in said vertical longitudinal middle plane, and means connecting a rear end of said rod to an angle of attack control device placed at the disposal of the pilot, whereby a pilot can move said rod in said vertical longitudinal middle plane, means mounting said pilot suspension harness for swinging movement, and said angle of attack control device including a bar positioned in front of a pilot position and fast to said pilot's suspension harness whereby the auto-stabilizing effect of the movement of said center of gravity of the glider is amplified during the swinging movement of a pilot borne by said harness.

* * * * *